United States Patent [19]

Haselwood et al.

[11] 3,742,462

[45] June 26, 1973

[54] DATA SYNCHRONIZING UNIT FOR DATA TRANSMISSION SYSTEM

[75] Inventors: Donald E. Haselwood, Deerfield; Carl M. Solar, Glenview, both of Ill.

[73] Assignee: A. C. Nielsen Company, Chicago, Ill.

[22] Filed: Feb. 17, 1972

[21] Appl. No.: 227,143

Related U.S. Application Data

[62] Division of Ser. No. 15,696, March 2, 1970, Pat. No. 3,651,471.

[52] U.S. Cl. .............................................. 340/172.5
[51] Int. Cl. .............................................. H04l 7/04
[58] Field of Search .................................. 340/172.5

[56] References Cited

OTHER PUBLICATIONS

Schaal, H. et al., "Noise Discrimination for Synchronous Communication Receivers", IBM Technical Disclosure Bulletin, Vol. 11, No. 6, Nov. 1968, p. 684–685.

*Primary Examiner*—Raulfe B. Zache
*Attorney*—Richard D. Mason, Willis J. Jensen et al.

[57] ABSTRACT

A data synchronizing unit analyzes an incoming data signal and generates a strobe signal at times when data bits may be extracted from the incoming data signal with the least chance of error. The synchronizing unit makes it possible to transmit a continuous stream of data bits from one location to another without using stop and start codes and without transmitting a stream of timing or synchronization signals along with the data bits. A variable-mod counter generates a square wave signal the leading edge of which is the desired strobe signal. A constant frequency source drives the counter at a frequency which precisely equates the normal period of the counter-generated square wave signal with the time allotted to the transmission of one data bit. A digital phase detector keeps the trailing edge of the square wave signal phase-locked with level transitions of the incoming signal by slightly increasing or decreasing the counter mod number whenever a phase error appears. A starting circuit initializes the variable-mod counter phase-locked with the first level transition of the incoming signal and thus avoids any delay before phase-lock is achieved.

7 Claims, 2 Drawing Figures

DATA SYNCHRONIZING UNIT 2000

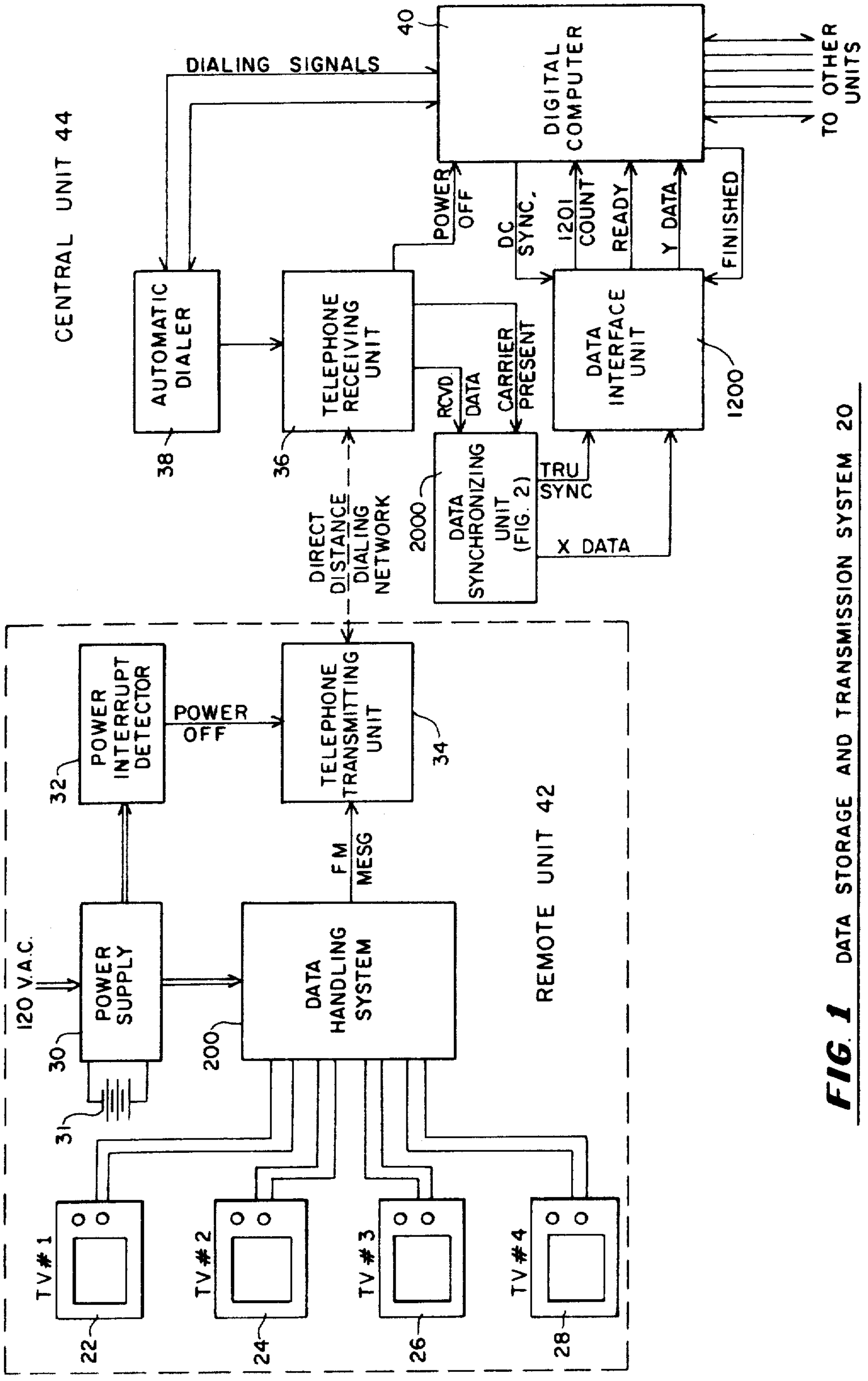
FIG. 1 DATA STORAGE AND TRANSMISSION SYSTEM 20

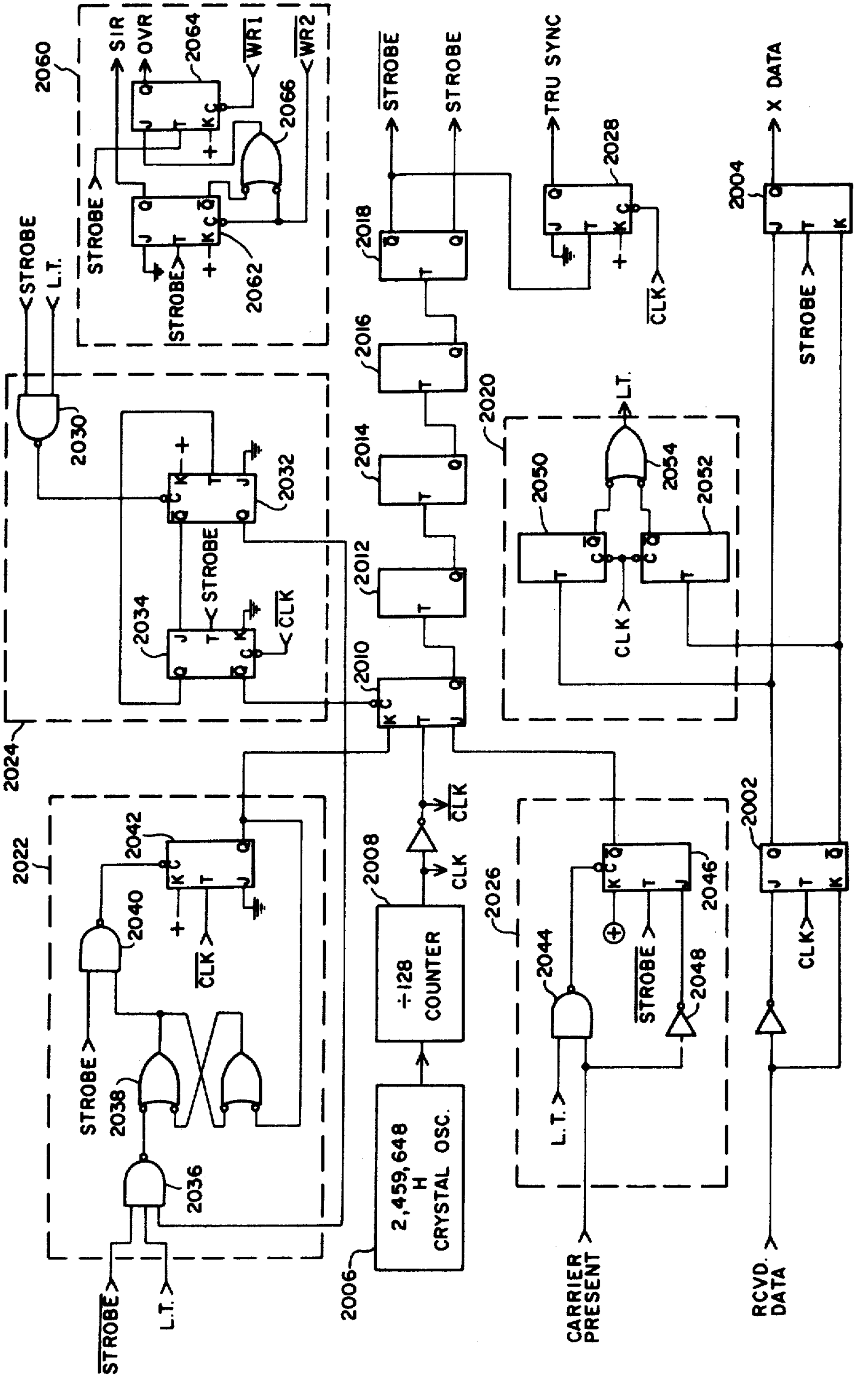
FIG 2 DATA SYNCHRONIZING UNIT 2000

DATA SYNCHRONIZING UNIT FOR DATA TRANSMISSION SYSTEM

CROSS REFERENCE TO RELATED APPLICATION

The present application is a division of application Ser. No. 15,696 filed on Mar. 2, 1970, now U.S. Pat. No. 3,651,471 which issued on Mar. 21, 1972.

BACKGROUND OF THE INVENTION

The present invention relates to data transmission systems, and more particularly to systems for extracting data bits from an incoming signal which presents a continuous stream of data bits.

In the past it has been necessary to add some form of synchronizing signal to any data transmission signal. Teleprinters, for example, customarily add start and stop signals to each group of transmitted data bits so as to synchronize the data receiver with the data transmitter. Complex equipment is required to add start and stop signals to data sets for transmission, and the frequent use of such signals reduces the number of data bits which can be transmitted per unit time. A noise spike which distorts a start pulse can throw off the receiver timing and can cause improper reception of an entire group of data bits. If a second channel is available, synchronizing signals may be transmitted over the second channel to indicate when data bits are transmitted. This halves the number of useful bits which can be transmitted per channel, however. Phase shifts and noise in the second channel can still throw off receiver timing and can cause the erroneous reception of data bits.

SUMMARY OF THE INVENTION

Accordingly, it is a primary object of the present invention to enable data to be transmitted unaccompanied by any synchronizing signal.

Another object of the present invention is to design a receiver which can generate its own synchronizing signals at times when data bits may be extracted from the incoming data signal with the least chance of error.

A further object of the present invention is to design a receiver which locks into approximate synchronization with an incoming data signal as soon as the data signal is received.

In accordance with these and many other objects, an embodiment of the present invention comprises a data transmission system in which a data transmitter transmits data bits at a constant bit transmission rate to a data receiver without the assistance of any synchronization signals. A data synchronizing unit connected to the data receiver analyzes the incoming data signal and generates a strobe or synchronizing signal at times when data bits may be extracted from the incoming signal with the least chance of error.

A variable-mod counter within the data synchronizing unit generates a waveform the leading (or trailing) edge of which is the desired strobe signal. A constant frequency source supplies this counter with pulses whose repetition rate is chosen to precisely equate the normal period of the counter (the time required for the counter to count through a complete counting cycle) with the time allotted to the transmission of one data bit. The trailing (or leading) edge of the counter output waveform is phase-locked with all level transmissions of the incoming data signal by phase comparing circuitry. If a level transmission occurs before or after the occurrence of the trailing (leading) edge of the counter output, the phase comparing circuitry adds or substracts "one" from the mod number of the variable mod counter during one counting cycle to minimize the phase error slightly during each counting cycle. The leading (trailing) edge of the counter output is thus forced to occur at the approximate center of each incoming signal bit. Since the counter is frequency locked with the transmitter bit transmission rate, the strobe signal can continue to occur at the proper time even when no level transitions occur in the incoming signal over an extended length of time. Since a single level transition can only change the timing of the strobe signal by a very small amount, the timing of the receiver cannot be seriously thrown off by noise pulses causing false level transitions.

When no incoming signal is present, the counter is locked at a count roughly corresponding to the strobe signal generation. When an incoming signal appears a starting circuit unlocks the counter when the first level transition occurs in the incoming signal. In this manner, the receiver is roughly synchronized with the transmitter starting with the first level transition which occurs in the incoming signal.

Further objects and advantages of the present invention will become apparent as the following detailed description proceeds, and the features of novelty which characterize the present invention will be pointed out with particularity in the claims annexed to and forming a part of this specification.

BRIEF DESCRIPTION OF THE DRAWINGS

For a further understanding of the present invention, reference will be made to the drawings wherein:

FIG. 1 is a block diagram of a data storage and transmission system which includes a data synchronizing unit designed in accordance with the present invention; and FIG. 2 is a logic diagram of the data synchronizing unit used in the data storage and transmission system shown in FIG. 1.

DESCRIPTION OF THE PREFERRED EMBODIMENT

The preferred embodiment of the present invention is utilized within a data storage and transmission system which can collect data characterizing tuning condition and on-or-off status of a large number of television receivers; store this data temporarily at remote locations; and then periodically transfer this data over long distance telephone lines to a centrally located digital computer. A data handling system is provided for each cluster of television receivers located within a single building, home, or area. The data handling systems check the tuning condition and also the on-or-off status of each receiver within each cluster periodically, for example, once every 30 seconds. The data handling systems do not, however, record data characterizing the tuning condition and on-or-off status of the monitored receivers every thirty seconds. Data is collected only after a monitored receiver is returned or is turned on or off. This data, along with the time that elapses before another tuning condition or on-or-off status change occurs, is compiled into a data set that is called a "change line" or "change line data set" and is stored within the data handling system.

A detailed description of this data storage and transmission system is to be found in application Ser. No. 15,696 filed on Mar. 2, 1970. The specification and the drawings of that application are hereby incorporated by reference into the present application for all purposes. The paragraphs which follow, together with FIG. 1, present a summary description of this data storage and transmission system and are intended to serve as an introduction to the detailed description of the present invention.

Referring now to the drawings, FIG. 1 shows a block diagram of the data storage and transmission system which is indicated generally by the reference numeral 20. The system 20 includes basically a central unit 44 connected by the telephone direct distance dialing network to a plurality or remote units such as the typical remote unit 42. The remote unit 42 includes anywhere from one to four monitored television receivers 22, 24, 26, and 28 each of which supplies five bits of tuning condition and on-or-off status data to a data handling system 200. The data handling system 200 generates an FM MESG (frequency modulated message) signal. This FM MESG signal contains data characterizing the tuning condition and on-or-off status of the monitored receivers both currently and in the recent past. The FM MESG signal is continuously fed to a telephone transmitting unit 34 for transmission to the central unit 44.

The data handling system 200 includes a 1,201 bit circulating memory with sufficient capacity to store forty 30-bit change lines and one marker bit. As the memory circulates, its contents are continuously presented as the FM MESG signal. The marker bit is reversed in sign each time the memory circulates.

The telephone transmitting unit 34 is a conventional telephone signal transmission unit which goes "off hook" for a period of 30 seconds or so in response to a ringing signal, and which then transmits the FM MESG signal and also a POWER OFF tone directly to the central unit 44 via the direct distance dialing network.

Power for the data handling system 200 and for the telephone transmitting unit 34 comes from batteries 31 which are trickle charged by a power supply 30 connected to a 120 volt A.C. source of potential. Electrical power interruptions in the 120 volt A.C. source are detected by a power interrupt detector 32 which generates a 367 cycle POWER OFF tone whenever an interruption occurs. This POWER OFF tone is fed directly to the telephone transmitting unit 34 for transmission to the central unit 44.

The central unit 44 includes a conventional digital computer 40 and a conventional telephone receiving unit 36. The computer 40 is connected to the receiving unit 36 by a data interface unit 1200 and a data synchronizing unit 2000 and also by a conventional automatic dialer 38. When data is to be transmitted to the central unit 44 from a remote unit, the digital computer 40 generates dialing signals which are supplied to the automatic dialer 38. The automatic dialer 38 generates the necessary "touch tones" to establish a telephone connection between the telephone receiving unit 36 and a remote telephone transmitting unit, for example the unit 34. The transmitting unit 34 then transmits to the telephone receiving unit 36 both the FM MESG signal and the POWER OFF tone signal. The telephone receiving unit 36 translates the POWER OFF tone signal into a digital POWER OFF signal which is fed directly to the digital computer 40. It also translates the FM MESG signal into a digital RCVD. DATA signal which is fed to the data synchronizing unit 2000 and generates a CARRIER PRESENT signal whenever the FM MESG signal carrier is being received. In the preferred embodiment, the unit 36 is a DATAPHONE (registered trademark) telephone receiving unit model 202C manufactured by Western Electric Company, Incorporated.

The data synchronizing unit 2000 lies at the heart of the present invention. The unit 2000 converts the relatively unstable RCVD. DATA signal into a precisely formed X DATA signal. The unit 2000 also generates TRU SYNC (telephone receiving unit sync) pulses which strobe the X DATA signal into the data interface unit 1200. The CARRIER PRESENT signal is also used by the unit 2000 to reduce the time which it takes for the unit 2000 to lock into phase synchronization with the data bits comprising the RCVD. DATA signal. The unit 2000 is largely responsible for the high degree of accuracy of the data transmission portions of the present invention. A detailed description of the unit 2000 is presented below.

The data interface unit 1200 is used to store the X DATA signal, to check it for transmission errors, and to then present it at high speed to the digital computer 40 in the form of a Y DATA signal. When the unit 1200 has accurately received the transmitted data, it generates a READY signal. This signal initiates an interrupt of the digital computer 40. The computer 40 then receives one set of data from the data interface unit 1200 in the form of a Y DATA signal. In the embodiment shown, the Y DATA signal presents one data bit each time the data interface unit 1200 receives a D.C. SYNC (digital computer synchronization) signal from the computer 40. When the computer 40 has received and stored the Y DATA signal, it generates a FINISHED signal which prepares the data interface unit 1200 for reception of the next transmission.

The data synchronizing unit 2000 (FIG. 2) is constructed using resistor-transistor integrated logic circuitry (RTL). This particular line of logic circuitry includes one basic gate configuration which can be used as a NAND logic element, as a NOR logic element, and as an inverting or NOT logic element. The basic feature of the RTL logic gate is that its output goes positive only when all of its inputs are at ground level. An example of such a gate used as a NAND gate is a gate 2036 shown in FIG. 2. An example of such a gate used as a NOR gate is a gate 2038 shown in FIG. 2. An example of such a gate used as an inverting or NOT gate is a gate 2048 shown in FIG. 2.

In the detailed description of the unit 2000 which follows, only rarely will any mention be made of whether a signal is at a high level, at ground level, or inverted. For the most part, only the presence or absence of a signal will be mentioned. FIG. 2 clearly indicates all inverted signals either by overlining of the signal name or by separation of the signal line from adjacent gates with inverting circles. Thus, for example, the CARRIER PRESENT and the L.T. signals which flow into the gate 2044 are non-inverted, while the signal coming out of the gate 2044 is inverted, as indicated by the inverting circle at the gate 2044 output. Whenever a signal is said to be present, the associated signal line is at ground level if the signal is not inverted, or is positive if the signal is inverted. Similarly, whenever a signal is said to be absent, the associated signal line is positive if the signal is not inverted, and is at ground level if the signal is inverted. For example, a sentence might read in part: "Since signals are present at all the inputs to the NAND gate 2040, the gate 2040 generates an output signal which clears the flip-flop 2042". FIG. 2 reveals that the signals flowing into the gate 2040 are non-inverted and the signal flowing out of the gate 2040 is inverted. Thus one may conclude that all the inputs to the gate 2040 are at ground level, and the output of the gate 2040 is positive.

A typical JK flip-flop is the flip-flop 2002 shown in FIG. 2. The JK flip-flop 2002 has two outputs, a non-inverted output labelled Q and an inverted output labelled $\bar{Q}$. The flip-flop 502 has J and K inputs, the J input located opposite the Q output and the K input located opposite the $\bar{Q}$ output. The flip-flop 2002 also has a toggle or clock input labelled T. When the J and K inputs are at ground potential, the flip-flop 2002 toggles each time a negative going transition occurs at the toggle or T input. When the J and K inputs are at opposing levels, the Q output is shifted to the same level as the J input when the toggle or T input receives a negative going level transition, and simultaneously the $\bar{Q}$ output is shifted to the same level as the K input. If the J and K inputs are both at a positive level, then the flip-flop 2002 remains in the same state following a negative transition of the T or toggle input. If both the J and K inputs are grounded, they are often not shown. JK flip-flops occasionally come equipped with a direct clear (C) terminal.

The data synchronizing unit 2000 is shown in FIG. 2. The unit 2000 converts the relatively unstable RCVD. DATA signal into the uniform and symmetrical X DATA signal. The unit 2000 also generates the TRU SYNC pulses for the data interface unit 1200 (FIG. 1).

Referring now to FIG. 2, the RCVD. DATA signal is applied to the J and K inputs of the flip-flop 2002 and is strobed into the flip-flop 2002 by a CLK (clock) signal. This CLK signal occurs 32 times during each bit timing interval for the incoming data. The data bits appear at the outputs of the flip-flop 2002 synchronously with the leading negative going edge of the CLK signal. The Q and $\bar{Q}$ output signals generated by the flip-flop 2002 are connected in shift register manner to the J and K inputs of a flip-flop 2004. The flip-flop 2004 is strobed by the leading (negative going) edge of a STROBE signal applied to the flip-flop's toggle input. The X DATA signal appears at the Q output of the flip-flop 2004.

The primary task of the data synchronizing unit 2000 is to generate the STROBE signal at the precise center of each bit timing interval. This is the time when the signal presented by the flip-flop 2002 is most likely to be stable. This is not a trivial task. Level transitions of the RCVD. DATA signal identify the approximate times when bit timing intervals commence, but a long string of consecutive "1's" or "0's" gives no indication of the beginning and the end of each individual bit timing interval. Moreover, the time when level transitions occur can be affected by transmission errors and distortions. Therefore, the average moment at which level transitions occur must be recovered from the RCVD. DATA signal by the unit 2000 and used to control the precise timing of the STROBE signal.

Since the signal generators in the remote units (such as the remote unit 42 in FIG. 1) are crystal controlled, the bit transmission rate is accurately known. Therefore, it is only necessary for the unit 2000 to recover the phase of the incoming data string. The unit 2000 uses a digital filtering arrangement to extract the desired phase data and to average this data over a number of cycles. A crystal oscillator 2006 is provided having a crystal frequency that is identical to the crystal frequency of the crystals in the remote units. The output of this oscillator 2006 is fed through a divide by 128 counter 2008. The output signal generated by the counter 2008 is called the CLK (clock) signal. This signal fluctuates 32 times during each bit timing interval. A mod 32 (divide by 32) counter having a modulus that can be varied by plus or minus 1 is then used to convert the CLK signal into the STROBE signal. The mod 32 counter comprises five flip-flops 2010, 2012, 2014, 2016, and 2018 each having an output connected to the toggle input of the next flip-flop. The phase of the STROBE signal is then varied by altering the modulus of this mod 32 counter. If the STROBE signal commences too early, the modulus is increased to 33. If the STROBE signal commences too late, the modulus is decreased to 31. When properly phased, the STROBE signal commences (goes negative) at approximately the midpoint of each bit timing interval and thus loads incoming data into the flip-flop 2004 at the time when the output of the flip-flop 2002 is most likely to correctly represent the bit being transmitted.

The signal developed by the flip-flop 2002 is fed into a level transition detection circuit 2020. This circuit generates a L.T. (level transition) pulse each time the RCVD. DATA signal fluctuates. Two mod regulating circuits each including a phase comparison gate are then used to compare the timing of each L. T. pulse with the timing of the trailing edge of the STROBE signal. A mod increasing circuit 2022 increases the counter modulus to 33 in response to L. T. pulses which arrive later than the trailing edge of the STROBE signal. This mod increasing circuit 2022 generates a pulse which prevents a CLK pulse from reaching the mod 32 counter. 33 CLK pulses are then required to give a full count rather than 32. This circuit extends the duration of the STROBE signal and brings the trailing edge of the STROBE signal into synchronism with the L. T. pulses. A mod decreasing circuit 2024 decreases the counter modulus to 31 in response to L. T. pulses which arrive earlier than the trailing edge of the STROBE signal. This mod decreasing circuit 2024 generates a pulse that is fed into the mode 32 counter along with the CLK pulses. Only 31 CLK pulses are then required to give a full count. This circuit 2024 shortens the duration of the STROBE signal and brings the trailing edge of the STROBE signal into synchronism with the L. T. pulses. If the RCVD. DATA signal does not fluctuate for a period of time, no L. T. pulses are generated and the mod 32 counter runs freely with a modulus of 32. No significant phase drift is encountered because the difference between the frequency of the crystal oscillator 2006 and the frequency of the crystal oscillator in the home unit can be less than $2 \times 10^{-4}$ seconds per bit. At this rate it would take at least 5000 bit timing intervals for the unit 2000 to drift one bit timing interval.

The system 20 is designed so that level transitions in the transmitted signal occur quite frequently.

A starting circuit 2026 is provided to stop the mod 32 counter at a predetermined count and to start the mod 32 counter synchronously with the first level transition of the RCVD. DATA signal. If this circuit were not provided, it would take as many as 16 level transitions of the incoming signal to pull the STROBE signal into proper synchronization with the incoming data bits. This starting circuit 2026 is controlled by the CARRIER PRESENT signal generated by the telephone receiving unit 36 (shown in FIG. 1). As noted above, the CARRIER PRESENT signal commences as data bits begin to appear in the form of the RCVC. DATA signal. When a transmission is terminated, the CARRIER PRESENT signal is also terminated. When the CARRIER PRESENT signal terminates, the starting circuit 2026 allows the mod 32 counter to advance to a count of 17 and then locks the mod 32 counter. When the CARRIER PRESENT signal recommences, the signal enables the starting circuit 2026 to release the divide by 32 counter synchronously with the occurrence of the next L. T. pulse. Since the divide by 32 counter starts with a count of 17, the leading edge of the STROBE signal occurs 15 counts after the L. T. pulse, at approximately the center of a bit timing interval. Hence, the SYNC signal is locked in phase as soon as the first level transition in the RCVD. DATA signal occurs.

The TRU SYNC (telephone receiving unit synchronization) signal is generated by a flip-flop 2028. The flip-flop 2028 is set by an inverted STROBE pulse applied to its toggle input and is immediately cleared by an inverted CLK pulse which is applied to its clear input. The TRU SYNC pulse is a sharply defined pulse that occurs in the middle of each bit timing interval as defined by the X DATA signal.

The mod decreasing circuit 2024 receives as input signals the STROBE signal and the L. T. pulse signal. Both of these signals are fed into a phase detecting gate 2030. The gate 2030 generates an output pulse which clears a flip-flop 2032 only when an L. T. pulse occurs while the STROBE signal is present. The flip-flop 2032 then enables a flip-flop 2034 to be set by the leading edge of the STROBE signal when the STROBE signal next commences. The $\bar{Q}$ output of the flip-flop 2032 is connected to the J input of the flip-flop 2034, and the K input to the flip-flop 2034 is grounded. The toggle input to the flip-flop 2034 is connected to the STROBE signal. The flip-flop 2034 remains set for half of the interval defined by the spacing between successive CLK pulses and is cleared by an inverted CLK pulse. The $\bar{Q}$ out-put of the flip-flop 2034 clears the flip-flop 2010 prematurely and thus causes the next STROBE signal to be generated after only 31 CLK pulses have been applied to the flip-flop 2010. This reduces the mod 32 counter modulus to 31. The Q output of the flip-flop 2034 is connected to the toggle input of the flip-flop 2032. The K input of the flip-flop 2032 is held positive and the J input is grounded. The flip-flop 2032 is therefore returned to its stand-by set state when the flip-flop 2034 is set by the STROBE signal.

The mod increasing circuit 2022 receives as input signals the inverted STROBE signal, the L. T. pulse signal, and the Q output signal generated by the flip-flop 2032. These three signals are all fed into a phase detecting NAND gate 2036. When the STROBE signal is not present and the flip-flop 2032 is not cleared, the occurrence of an L. T. pulse causes the gate 2036 to generate a negative pulse and to set a bistable 2038. A NAND gate 2040 is then enabled by the bistable 2038. The next occurrence of the STROBE signal passes through the NAND gate 2040 and clears a flip-flop 2042. The Q output of the flip-flop 2042 clears the bistable 2038 and thus immediately disables the gate 2040. The Q output of the flip-flop 2042 applies a positive level signal to the K input of the flip-flop 2010 and prevents the next inverted CLK pulse from toggling the flip-flop 2010. This increases the mod 32 counter modulus to 33. This same next inverted CLK pulse toggles and sets the flip-flop 2042 which in turn returns the K input of the flip-flop 2010 to ground. The inverted CLK signal is applied to the toggle input of the flip-flop 2042. The K input of the flip-flop 2042 is connected to a positive source of potential, and the J input of the flip-flop 2042 is grounded.

The starting circuit 2026 comprises a flip-flop 2046 and a two input NAND gate 2044. The input signals supplied to the NAND gate 2044 are the L. T. pulse signal and the CARRIER PRESENT signal generated by the telephone receiving unit 46 (shown in FIG. 1). The output of the gate 2044 is connected to a clear terminal of the flip-flop 2046. The K input to the flip-flop 2046 is strapped to a positive potential node while the J input is connected to the CARRIER PRESENT signal by an inverter 2048. The inverted STROBE signal is applied to the toggle input of the flip-flop 2046. The $\bar{Q}$ output of the flip-flop 2046 is then connected to the J input of the flip-flop 2010.

When the CARRIER PRESENT signal terminates, it disables the gate 2044 from passing L. T. pulses and pulls the J input of the flip-flop 2046 to ground. When the mod 32 counter reaches a count of 16, the inverted STROBE signal goes to ground and toggles the flip-flop 2046 so that the $\bar{Q}$ output of the flip-flop 2046 goes positive. This positive level signal is applied to the J input of the flip-flop 2010. At this moment the flip-flop 2010 is set with its Q output at ground level. The next inverted CLK pulse toggles the flip-flop 2010 so that its Q output goes positive and matches the J input. Any further inverted CLK pulses have no effects upon the mod 32 counter. Hence, the mod 32 counter is locked at a count of 16 plus 1 or 17.

When the CARRIER PRESENT signal recommences, it enables the NAND gate 2044. When the RCVD. DATA signal next fluctuates, an L. T. (level transition) pulse passes through the NAND gate 2044 and clears the flip-flop 2046. This causes the $\bar{Q}$ output of the flip-flop 2046, and hence the J input of the flip-flop 2010, to go to ground. The mod 32 counter then resumes counting at a count of 17. The STROBE signal commences 15 counts after this first L. T. pulse. In this manner, the data synchronizing unit 2000 is initially synchronized with the initial fluctuation of the incoming signal and does not normally require additional time to lock into synchronization. Since both the J and K inputs of the flip-flop 2046 are held positive when the CARRIER PRESENT signal is present, further negative transitions of the inverted STROBE signal have no effect upon the flip-flop 2046 until the CARRIER PRESENT signal terminates once again.

The level transition detection circuit 2020 includes two level transition detection flip-flops 2050 and 2052 and an output NOR gate 2054. The flip-flops 2050 and 2052 have their toggle inputs connected respectively to the non-inverted and inverted outputs of the flip-flop 2002 so that one or the other of these flip-flops is toggled each time the flip-flop 2002 toggles in response to a fluctuation of the incoming RCVD. DATA signal. The flip-flop 2002 toggles synchronously with the leading edge of a CLK pulse, as was explained above. Since the flip-flops 2050 and 2052 toggle simultaneously with the flip-flop 2002, they also toggle synchronously with the leading edge of a CLK pulse. When a CLK pulse terminates, its trailing edge is applied to the clear inputs of the flip-flops 2050 and 2052 to clear the flip-flops 2050 and 2052. Hence, a short duration positive level pulse appears at the output of one of the two flip-flops 2050 or 2052 each time there is a fluctuation in the RCVD. DATA signal. These positive level pulses are ORed together by the NOR gate 2054 to form the negative going L. T. (level transition) pulse signal.

If data collection is performed by a digital computer, it is desirable to have some form of computer interface circuit which can give an indication whenever data is lost through the computer's failure to collect data bits from the X DATA signal at a sufficiently high rate of speed. Such a circuit is shown in FIG. 20 and is indicated by the reference numeral 2060. This circuit includes two flip-flops 2062 and 2064 and a NOR gate 2066. The flip-flop 2062 has its J input grounded and its K input connected to a positive potential. This flip-flop 2062 is toggled by the leading edge of the STROBE signal at the same moment that data is loaded into the flip-flop 2004. The output signal generated by the flip-flop 2062 is called the SIR (X DATA signal is ready) signal. This SIR signal tells the digital computer that it is now time to sample the X DATA signal. When the computer has sampled the X DATA signal, the computer generates a positive level WR 2 signal which is applied to the clear input of the flip-flop 2062 and thus terminates the SIR signal. The inverted output of the flip-flop 2062 and also the WR 2 signal are ORed together by the NOR gate 2066 and are fed into the J input of the flip-flop 2064. The K input of the flip-flop 2064 is strapped to a positive potential point, and the toggle input of the flip-flop 2064 is connected to the STROBE signal. If the computer does not clear the flip-flop 2062 before the next commencement of the STROBE signal, or if the WR 2 signal is still present at the commencement of the next STROBE signal, the flip-flop 2064 is set generating an OVR (overrun) signal. This signal tells the digital computer that it has probably just lost a data bit, and that therefore the data collection procedure should be started from the beginning. A WR 1 signal is then generated by the computer and applied to the clear input of the flip-flop 2064 to terminate the OVR signal.

Although the present invention has been described with reference to an illustrative embodiment thereof, it should be understood that numerous other modifications and changes will readily occur to those skilled in the art and it is therefore intended by the appended claims to cover all such modifications and changes that with fall within the true spirit and scope of the invention.

What is claimed as new and desired to be secured by Letters Patent of the United States is:

1. A data synchronizing unit for extracting data bits from an incoming signal comprising:
- a counter having an input and an output;
- mod increasing circuit means connected to said counter for increasing the mod of the counter;
- mod decreasing circuit means connected to said counter for decreasing the mod of the counter;
- a source of fixed frequency pulses connected to the input of the counter and having a frequency chosen so that the counter output normally fluctuates at the bit transmission frequency of the incoming signal;
- means for generating a level transition signal each time the incoming changes its level and comprising two flip-flops both connected to the incoming signal, one of which is arranged to toggle upon positive fluctuations in the incoming signal and the other of which is arranged to toggle upon negative fluctuations in the incoming signal, and the output of said two flip-flops being ORed together to form a single level transition signal; and
- phase comparison means for comparing the phase of said level transition signal to the phase of the counter output and for energizing the mod increasing circuit means and the mod decreasing circuit means as needed to keep the counter output in phase with the level transition signal.

2. A data synchronizing unit for extracting data bits from an incoming signal comprising:
- a counter having an input and an output, and including means for generating approximately a square wave output signal;
- mod increasing circuit means connected to said counter for increasing the mod of the counter;
- mod decreasing circuit means connected to said counter for decreasing the mod of the counter;
- a source of fixed frequency pulses connected to the input of the counter and having a frequency chosen so that the counter output normally fluctuates at the bit transmission frequency of the incoming signal;
- means for generating a level transition signal each time the incoming signal changes its level;
- strobing means for causing the incoming signal to be strobed for data bits in synchronism with one edge of said counter square wave output signal; and
- phase comparison means for comparing the time of occurance of each of said level transition signals with the time of occurance of the other edge of said counter square wave output signal and for energizing the mod increasing circuit means and the mod decreasing circuit means as needed so as to minimize the time lag between the occurance of the level transition signal and said other edge of said square wave signal, thereby keeping said counter output in approximate phase with the level transition signal.

3. A data synchronizing unit for extracting data bits from an incoming signal comprising:
- a counter having an input and an output;
- mod increasing circuit means connected to said counter for increasing the mod of said counter;
- mod decreasing circuit means connected to said counter for decreasing the mod of said counter;
- a source of fixed frequency pulses connected to the input of said counter and having a frequency chosen so that the counter output normally fluctuates at the bit transmission frequency of the incoming signal;
- means for generating a level transition signal each time the incoming signal changes its level; and
- phase comparison means for comparing the phase of said level transition signal to the phase of the counter output and for energizing the mod increasing circuit means and the mod decreasing circuit means as needed to keep the counter output in phase with the level transition signal, said phase comparison means comprising a first gate receiving as inputs the counter output and a level transition signal and having an output connected to one of said mod increasing or decreasing circuit means, and a second gate receiving as inputs the inverted counter output and the level transition signal, and having an output connected to the other of said mod increasing or decreasing circuit means.

4. A data synchronizing unit in accordance with claim 3 wherein the mod increasing and decreasing circuit means each comprise two flip-flops, wherein the first flip-flop is connected to and set by the output signal of one of the phase comparison gates, wherein the second flip-flop is connected to and enabled by an output of the first flip-flop, wherein the second flip-flop is connected to and is set by the counter output signal when enabled by said first flip-flop and is connected to and cleared by a subsequent high frequency pulse, and wherein the output of said second flip- is fed into and is used to alter the mod of the counter.

5. A data synchronizing unit for extracting data bits from an incoming signal comprising:

a counter having an input and an output and including an inhibit input to which a signal may be applied so as to inhibit the counter from advancing;

mod increasing circuit means connected to said counter for increasing the mod of the counter;

mod decreasing circuit means connected to said counter for decreasing the mod of the counter;

a source of fixed frequency pulses connected to the input of the counter and having a frequency chosen so that the counter output normally fluctuates at the bit transmission frequency of the incoming signal;

means for generating a level transition signal each time the incoming signal changes its level;

phase comparison means for comparing the phase of said level transition signal to the phase of the counter output and for energizing the mod increasing circuit means and the mod decreasing circuit means as needed to keep the counter output in phase with the level trasnition signal;

means for generating a carrier present signal whenever said incoming signal is present; and starting circuit means for supplying an inhibit signal to said counter inhibit input when said counter reaches a predetermined count and when said carrier present signal is absent, said starting circuit means including means for terminating said inhibit signal upon the occurrence of a level transition signal following the recommencement of said carrier present signal;

whereby the counter may be started in approximate phase synchronization with the onset of the incoming signal.

6. A data synchronizing unit in accordance with claim 5 wherein the starting circuit means comprises a flip-flop having an output connected to the counter inhibit input, having a toggle input connected to the counter output, having an additional direct clear input connected to the carrier present signal and to the level transition signal by an AND gate, and including J and K inputs connected respectively to the carrier present signal and to a source of potential in such a manner that the toggle input is inhibited whenever the carrier present signal is present but so that the toggle input allows the flip-flop to be toggled so as to generate the inhibit signal whenever the carrier present signal is absent.

7. A data transmission system for transmitting binary data, said system comprising:

Data transmission means having a binary data input at one location and having a binary data output at another location and comprising an audio communications channel, first and second sources of audio tone, gating means responsive to the data presented at said binary data input for connecting the one or the other of said audio tones to one end of said audio communications channel, and frequency modulation receiver means connecting the other end of said communications chennel to said binary data output for converting tones re-ceived from said channel into a binary signal whose state depends upon the frequency of the tone;

data presentation means connected to said binary data input for serially presenting data to the input at a first bit presentation rate;

level transition detection means connected to said binary data output for generating a level transition signal in response to said binary data output changing its state;

a variable mod counter having an input and generating a strobe output signal;

an oscillator connected to said variable mod counter input and operating at a second rate chosen to cause said strobe output signal to fluctuate at said first bit presentation rate; and phase detection means for comparing the phase of said strobe output signal to the phase of said level transition signal and for varying the modulus of the counter as needed to keep these signals phased properly;

whereby the strobe output signal indicates the proper times to sample data bits presented at binary data outputs of said data transmission means.

* * * * *